(12) United States Patent
Wolf et al.

(10) Patent No.: US 7,827,127 B2
(45) Date of Patent: Nov. 2, 2010

(54) DATA SCOPING AND DATA FLOW IN A CONTINUATION BASED RUNTIME

(75) Inventors: Kenneth David Wolf, Seattle, WA (US); Edmund S. V. Pinto, Duvall, WA (US); Robert B. Schmidt, Woodinville, WA (US); Nathan C. Talbert, Seattle, WA (US); Stephen J. Millet, Edmonds, WA (US); Donald F. Box, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 549 days.

(21) Appl. No.: 11/977,846

(22) Filed: Oct. 26, 2007

(65) Prior Publication Data

US 2009/0112779 A1 Apr. 30, 2009

(51) Int. Cl.
*G06F 15/18* (2006.01)
(52) U.S. Cl. ...................................................... 706/14
(58) Field of Classification Search .................... 706/14
See application file for complete search history.

(56) References Cited

U.S. PATENT DOCUMENTS

| | | | |
|---|---|---|---|
| 5,761,514 A | 6/1998 | Aizikowitz et al. | |
| 6,026,226 A | 2/2000 | Heile et al. | |
| 6,370,681 B1 | 4/2002 | Dellarocas et al. | |
| 6,530,079 B1 | 3/2003 | Choi et al. | |
| 6,904,423 B1 | 6/2005 | Nicolaou et al. | |
| 7,197,502 B2* | 3/2007 | Feinsmith ........................... 1/1 | |
| 7,209,248 B1 | 4/2007 | Govindarajan et al. | |
| 7,272,820 B2 | 9/2007 | Klianev | |
| 7,451,432 B2* | 11/2008 | Shukla et al. ............... 717/106 |
| 7,464,366 B2* | 12/2008 | Shukla et al. ............... 717/100 |
| 7,565,640 B2* | 7/2009 | Shukla et al. ............... 717/105 |
| 7,624,125 B2* | 11/2009 | Feinsmith ........................... 1/1 |
| 7,631,291 B2* | 12/2009 | Shukla et al. ............... 717/107 |
| 7,739,135 B2* | 6/2010 | Shukla et al. ................... 705/7 |
| 2005/0044075 A1 | 2/2005 | Steere et al. | |
| 2006/0064673 A1 | 3/2006 | Rogers et al. | |
| 2006/0117302 A1 | 6/2006 | Mercer et al. | |

(Continued)

OTHER PUBLICATIONS

Implementation of the kernel techniques of real-time process algebra, Xinming Tan; Yingxu Wang; Ngolah, C.F.; Electrical and Computer Engineering, 2005. Canadian Conference on Digital Object Identifier: 10.1109/CCECE.2005.1557389 Publication Year: 2005 , pp. 2049-2052.*

(Continued)

*Primary Examiner*—Michael Holmes

(57) ABSTRACT

Described is a data model used in a continuation based runtime that executes activities. The data model provides for declaring parameters to define data flow direction (in, out or both in and out) with respect to activities. The model further allows for the declaring of variables to provide for data storing and sharing between activities that are in scope, based on a tree relationship between activities. In one aspect, an activity tree includes a topmost parent composite activity and at least one child activity of that topmost parent composite activity. Variables are associated with one or more composite activities of the tree, and the ancestral relationships between composite activities and (non-composite) child activities determine the in-scope access to variables. Arguments such as binding expressions may bind variables to an activity's parameters.

20 Claims, 4 Drawing Sheets

U.S. PATENT DOCUMENTS

2007/0101326 A1   5/2007   Cai et al.

OTHER PUBLICATIONS

An Improved Minimum Description Length Learning Algorithm for Nucleotide Sequence Analysis, Evans, S.; Markham, S.; Torres, A.; Kourtidis, A.; Conklin, D.; Signals, Systems and Computers, 2006. ACSSC '06. Fortieth Asilomar Conference on Digital Object Identifier: 10.1109/ACSSC.2006.355081 Publication Year: 2006, pp. 1843-1850.*

Implementation of the kernel techniques of real-time process algebra, Xinming Tan; Yingxu Wang; Ngolah, C.F.; Electrical and Computer Engineering, 2005. Canadian Conference on Digital Object Identifier: 10.1109/CCECE.2005.1557389 Publication Year: 2005, pp.: 2049 - 2052.*

An Improved Minimum Description Length Learning Algorithm for Nucleotide Sequence Analysis, Evans, S.; Markham, S.; Torres, A.; Kourtidis, A.; Conklin, D.; Signals, Systems and Computers, 2006. ACSSC '06. Fortieth Asilomar Conference on Digital Object Identifier: 10.1109/ACSSC.2006.355081 Publication Year: 2006, pp.: 1843 - 1850.*

Jagannathan, "Continuation-based Transformations for Coordination Languages." pp. 1-26.

Cain, "Runtime Data Analysis for Java Programs." pp. 1-7.

"Variables, Values, Scope, Lifetime.", http://www.jgcampbell.com/oopcpp/html/node5.html.

"Java/Data Types Variables and Arrays", http://www.meshplex.org/wiki/Java/Data_Types_Variables_and_Arrays.

International Search Report and Written Opinion Received for PCT Application No. PCT/US2008/081237, mailed on Jul. 23, 2009, 11 pages.

* cited by examiner

DATA SCOPING AND DATA FLOW IN A CONTINUATION BASED RUNTIME

BACKGROUND

A continuation based runtime operates by scheduling non-blocking work items. Work items can be associated with a callback identifying where a procedure (activity) is to be resumed. In general, an activity represents a unit of executable code comprising multiple pulses of work. Unlike conventional computer software programs that sequentially process data using a stack/heap, a continuation based program communicates by registering continuations and scheduling activities as future work to perform tasks. The system is fractal, and by manipulating the scheduling of future work (child activities), a higher-level composite activity can define arbitrary control-flow constructs.

In many computing scenarios, a continuation based runtime has advantages over a sequential computer software programs. These include facilitating what is known as passivation, by which an activity can be persisted and resumed (rehydrated) in a different process/thread, including on an entirely different machine. However, continuation based programs are at present relatively unstructured, e.g., any part of a program can access any piece of data. As a result, a lot of state needs to be preserved to passivate an activity. Moreover, improper use of data in programs written for continuation based runtimes can cause numerous problems.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a data model used in a continuation based runtime defines data flow direction with respect to activities via parameters, and provides for data storing and sharing between activities via variables that are in scope based on a tree relationship between activities. In one aspect, an activity tree includes a topmost parent composite activity and at least one child activity of that topmost parent composite activity. In one example, variables are associated with one or more composite activities of the tree; for example, arguments such as binding expressions may bind variables to an activity's parameters.

When processing activities of an activity tree in a continuation based runtime, parameters represent a flow of data relative to that activity, by declaring each parameter as an input parameter, an output parameter, or an input-output parameter. Variables are declared to represent the storage of data, e.g., as defined by an author. Scoping provides that a child activity may access variables up its parent chain. Binding expressions may be used to bind a parameter to in-scope variables.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a data model that facilitates multiple control flow manifestations in a continuation based runtime through defined data scoping and data flow. To this end and as described below, variables, parameters and arguments provide a mechanism for data scoping and data flow in a continuation based runtime. As will be understood, unlike other continuation based runtimes, or conventional programming models that work with procedural control flows, the benefits of a data model and data flow as described herein include better analysis and performance characteristics resulting from the predictable lifetime of data, accessibility rules for that data, and transparent data flow direction.

While various examples used herein generally use XAML for purposes of description, it is understood that these are only examples, and other code may be used with like models. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

In general, a program author defines activities (sometimes referred to as execution statements) comprising of work items to run. An author may define a composite activity (e.g., an abstract class) having child activities; one of the ways an activity can execute multiple pulses of work is through the scheduling of such child activities. This composition of activities, sometimes referred to as an execution policy, enables custom control flows that can be implemented through the scheduling of child activities zero (0), one (1) or n times, as determined by a parent composite activity.

Figure 1:
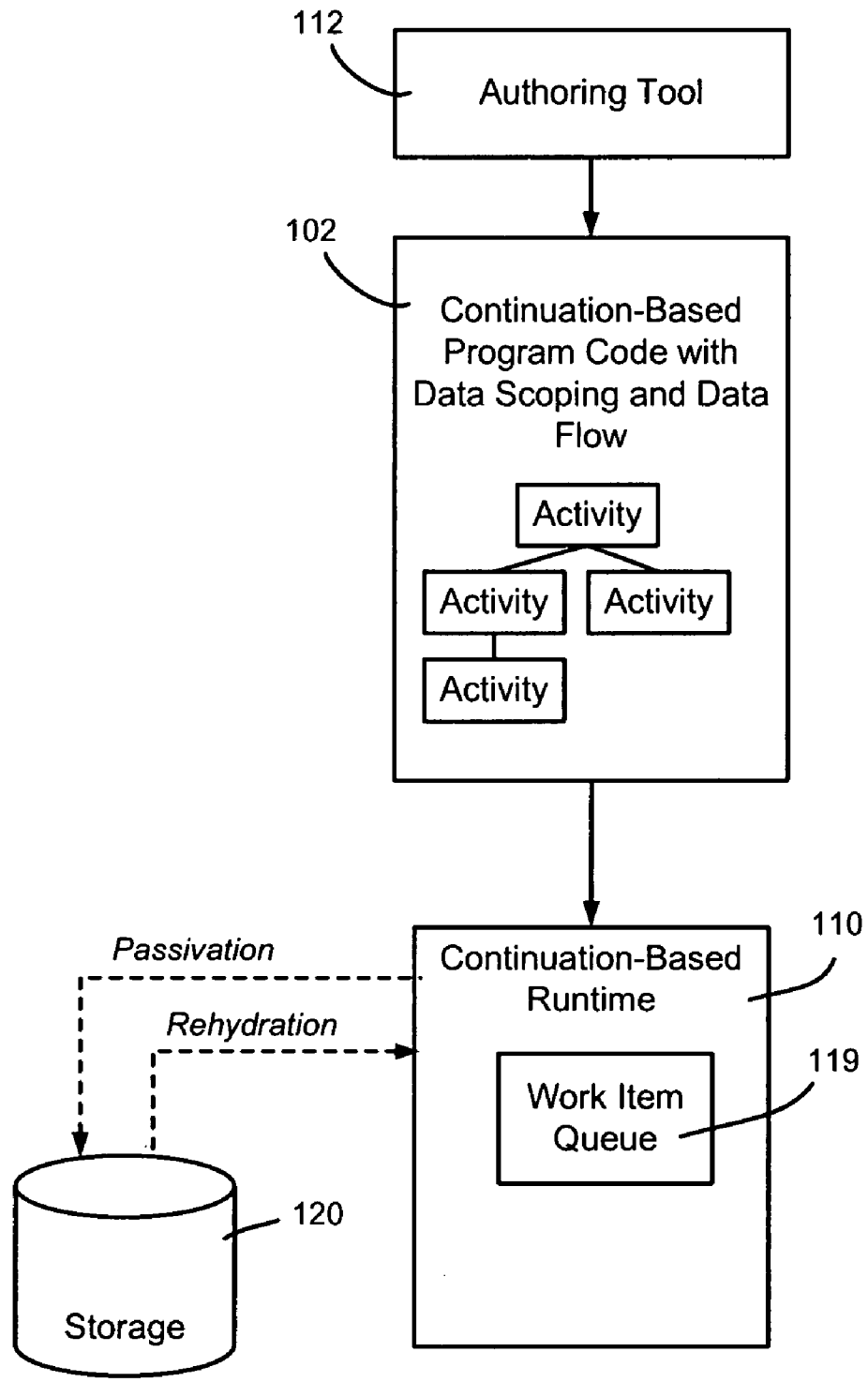
FIG. 1 is a block diagram representing example components for implementing a continuation based program with defined data scoping and data flow.

Turning to FIG. 1, there is shown a general set of components for running a continuation based program 102 in a continuation based runtime 110. An authoring tool 112 may be provided to assist the author.

Activities have no process affinity, whereby an activity running in a process may be paused and resumed in a different process. Further, activities have no thread affinity, whereby different pulses of work, shown in FIG. 1 as being run from a work item queue 119, can be run on different threads. By naming an activity and persisting it in conjunction with callback information and state data, an activity can be persisted (passivated such as to a nonvolatile storage 120, FIG. 1) and rehydrated (resumed from storage), including resuming in a different process.

An activity describes the state with which the activity works, through the use of parameters that provide the mechanism for describing the shape and direction of data on which the activity operates. In other words, parameters declare the type of data that can flow into or out of an activity. Each parameter has an explicit direction (in, out, or in/out).

Figure 2:
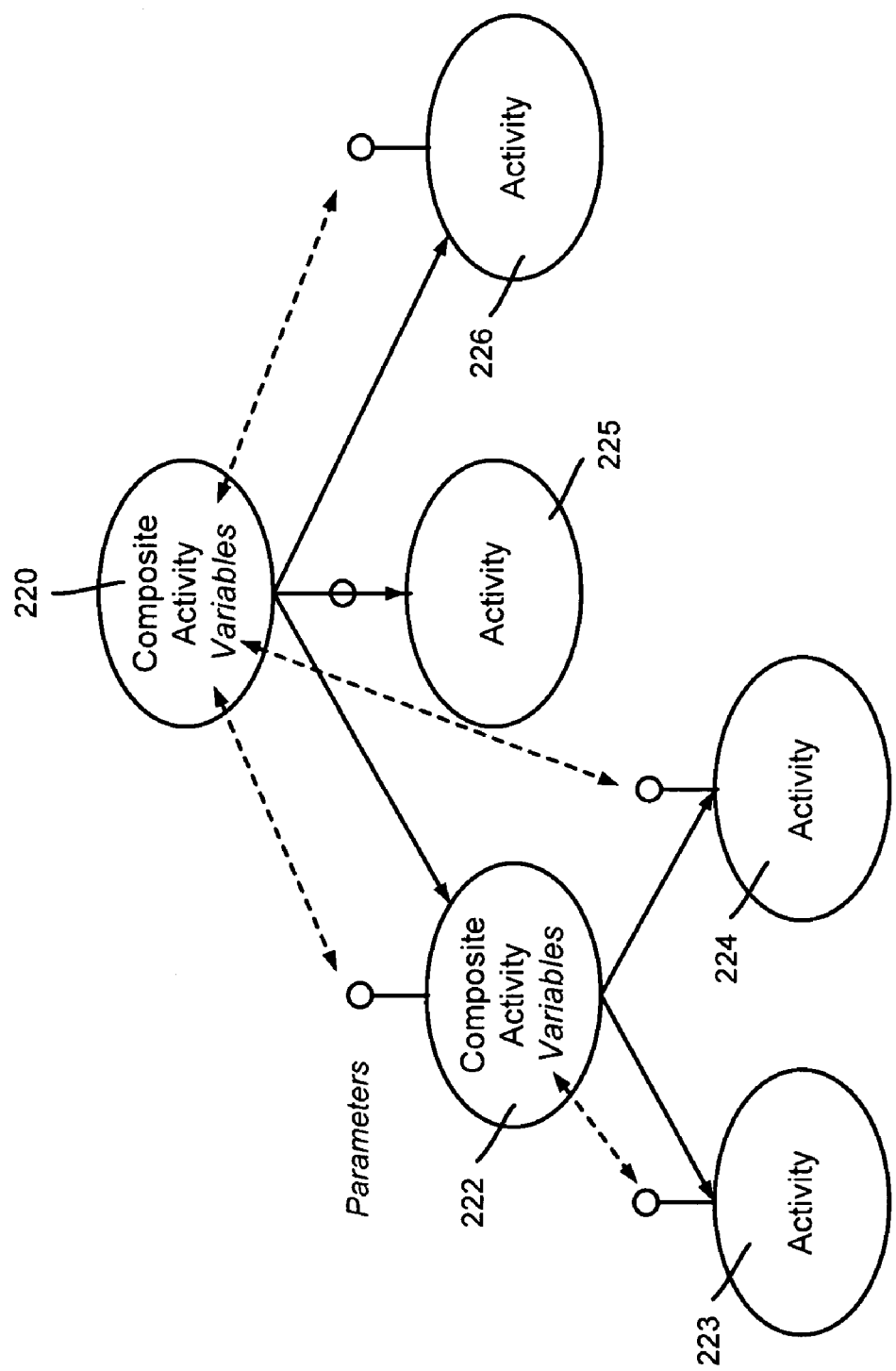
FIG. 2 is a representation of variables and parameters used among activities of a continuation based program.

As generally represented in FIG. 2, variables may be declared in a composite activity, such as the composite activity 220 or 222 (a child of the composite activity 220). Parameters may be bound to variables up the parent chain. Other child activities 223-226 are shown, and can access those variables. Variables comprise a declaration that represents the storage of data. A set of variables associated with a composite activity can be defined by the user. In this model, with respect to scoping, a child activity may access variables up its parent chain, and a composite activity (e.g., 222) may be a child of another composite activity (e.g., 220). Thus, in the example of FIG. 2, any of the activities 223-226 may access any of the variables defined in the composite activity 220 (all of these variables are in scope), but only the activities 223 and 224 may access the variables defined in the composite activity 222 because only they have composite activity 222 in their parental chain. Note that in this example implementation, variables are shown as only being defined in association with a composite activity, however it is feasible in alternative models for an activity (that is not a composite activity) to have its own variables.

Properties and parameters thus define a data contract (environment) for an activity description. State is shared between activities via variables that represent data storage and shared state. Shared state is associated with an activity by binding parameters to state using arguments; an argument comprises a binding terminal that represents the flow of data for an activity. Arguments have a binding expression that is a literal, or can resolve to variables. Variable access is scoped to the ancestor chain of an activity. In this model, arguments only use binding expressions that resolve to variables declared in their parent composites, that is, binding expressions are used to bind a parameter to in-scope variables. Only variables of executing activities are in an active state, that is, are in memory and persisted.

In the following example, an activity is defined in XAML, which sets forth example parameters, variables, and arguments and binding expressions. In this example, each parameter is indicated by "Parameter Name=" and variable by "Variable Name="; the arguments and binding expressions are represented by Text="[Message]", Text="[Response]" Text="['The user entered:'+Response]" and Value="[Response]" To="[Result]".

```
<ActivityDescription x:Name="Prompt">
    <ActivityDescription.Properties>
        <Parameter Name="Message" Type="{x:Type s:String}" Direction="In" />
        <Parameter Name="Result" Type="{x:Type s:String}" Direction="Out" />
    </ActivityDescription.Properties>
    <ActivityDescription.Body>
        <Sequence>
            <Sequence.Variables>
                <Variable x:Name="Response" Type="{x:Type s:String}" />
            </Sequence.Variables>
            <WriteLine Text="[Message]" />
            <ReadLine Text=" [Response]" />
            <WriteLine Text="['The user entered: ' + Response]" />
            <Assign Value="[Response]" To=" [Result]" />
        </Sequence>
    </ActivityDescription.Body>
</ActivityDescription>
```

As can be seen, the model described herein distinguishes between variables and arguments of an activity. The set of arguments are fixed as part of an activity's definition. By contrast, the list of variables associated with an activity is extensible by the workflow author, or any other user of the activity. In this manner, the activity model provides a rich mechanism for reasoning about and manipulating data.

Arguments and variables interact, as one possible binding of an argument is to a variable (which references a storage location). In this model, access to variables is scoped, whereby only arguments within the scope of a variable can be bound to that variable.

Variables provide a canonical way to declare the storage of data. The list of variables is part of the workflow program that can be configured at design time (and is locked down at execution time). The associated values are stored as part of the workflow instance. By way of example, the following sets forth a variable associated with an activity:

```
public abstract class CompositeActivity : Activity
{
    public IList<Variable> Variables
    {
        get;
    }
}
```

The variable definition contains the name and type of the variable being declared. An initial value expression can also be specified as part of the declaration. This expression is resolved at instance creation time. If no initial value expression is specified, then a default value "default(T)" may be used for the value initialization.

Variables also can have modifiers. For example, if a variable is read-only, then a "Const" (constant) modifier can be applied.

```
public class Variable
{
    public Variable(string name, Type variableType);
    public Variable(string name, Type variableType, ActivityExpression initialValueExpression);
    public Variable(string name, Type variableType, ActivityExpression initialValueExpression, VariableModifier modifier);
    public ActivityExpression InitialValueExpression { get; }
    protected virtual ActivityExpression InitialValueExpressionCore { get; }
    public VariableModifier Modifier { get; }
    public string Name { get; }
    public Type VariableType { get; }
}
public sealed class Variable<T> : Variable
{
    public Variable(string name);
    public Variable(string name, ActivityExpression<T> initialValueExpression);
    public Variable(string name, T initialValue);
    public Variable(string name, ActivityExpression<T> initialValueExpression, VariableModifier modifier);
    public Variable(string name, T initialValue, VariableModifier modifier);
    public ActivityExpression<T> InitialValueExpression { get; }
    protected override ActivityExpression InitialValueExpressionCore { get; }
}
public enum VariableModifier
{
    None,
    Const,
}
```

As described above and as represented in FIG. 2, a set of activities comprising an activity and its child activities may be considered as an activity tree. In the data model described herein, access to variables is constrained to ancestors in the activity tree. In other words, a variable is in scope only for the full closure of the corresponding activity's children (including its children's children, and so forth). These scoping rules are enforced by the runtime 110 (FIG. 1).

Moreover, the lifetime of a variable value is equal to the lifetime of its activity. Thus, upon completion of an activity, its variable values are disposed of. This model is advantageous, as variables no longer in use need not be persisted as part of the state that needs to be persisted to passivate another activity. For variable resolution, lexical resolution rules such as "first match wins" may be followed. As set forth herein, a named activity description signals a lexical scoping boundary; (that is, none of the arguments within the body of that description will attempt to resolve beyond the boundary of its containing description's environment).

The activity data model includes a facility to allow for variable declarations at the scope of a child activity. These declarations occur at a lexical scope in between those of the child activity and its parent. By way of example:

```
public sealed class ActivityExecutionContext
{
    public ActivityInstance ScheduleActivity(Activity activity,
ActivityExecutionCallback callback, ActivityEnvironment environment);
}
```

Child Instance Environment Variables allow for simpler authoring of iteration activities such as ForEach, and also enable features such modeling access to an exception variable within the scope of a catch handler.

Properties define the data contract for an activity description. When using a declarative authoring model, an activity author can define the name, type, modifiers, and (optional) default value for a property in an activity description. For example:

```
public class Property
{
    public Property(string name, Type propertyType);
    public Property(string name, Type propertyType, ActivityExpression
defaultValue);
    public ActivityExpression DefaultValue { get; }
    public string Name { get; }
    public Type PropertyType { get; }
}
public class Property<T> : Property
{
    public Property(string name);
    public Property(string name, ActivityExpression<T> defaultValue);
    public Property(string name, T defaultValue);
}
```

A parameter comprises a type of property for an activity description. Parameters define the contract for data flow in or out of an activity description. When the activity description is invoked as a program statement (Activity), then arguments, which can have expressions associated with them, are created based on the values of the configured parameters.

```
public class Parameter : Property
{
    public Parameter(string name, Type parameterType);
    public Parameter(string name, Type parameterType,
```

-continued

```
ParameterDirection direction);
    public Parameter(string name, Type parameterType,
ParameterDirection direction, ActivityExpression defaultValue);
    public ParameterDirection Direction { get; }
    public Type ParameterType { get; }
}
public sealed class Parameter<T> : Parameter
{
    public Parameter(string name);
    public Parameter(string name, ActivityExpression<T> defaultValue);
    public Parameter(string name, ParameterDirection direction);
    public Parameter(string name, T defaultValue);
    public Parameter(string name, ParameterDirection direction,
ActivityExpression<T> defaultValue);
    public Parameter(string name, ParameterDirection direction, T
defaultValue);
}
```

When using such an imperative authoring model, an activity author can use a strongly-typed mechanism for exposing its arguments. This is accomplished by declaring properties of type InArgument<T>, OutArgument<T>, and InOutArgument<T>. This mechanism allows an activity author to establish a crisp contract about the data going into and out of an activity.

```
public sealed class InArgument<T>
{
    public InArgument(ActivityExpression<T> expression);
    public ActivityExpression<T> Expression { get; }
}
public sealed class OutArgument<T>
{
    public OutArgument(ActivityLocationExpression<T> expression)
    public ActivityLocationExpression<T> Expression { get; }
}
public sealed class InOutArgument<T>
{
    public InOutArgument(ActivityLocationExpression<T> expression)
    public ActivityLocationExpression<T> Expression { get; }
}
```

After defining arguments using these property types on an activity, the activity model provides a facility to examine the arguments defined. The argument collection is obtained by calling the Arguments property on an activity (the argument collection is read-only).

By default, when the arguments property is called, an activity looks at its CLR (common language runtime) properties of the above types to generate an argument collection. However, the GenerateArguments method in the activity class may be overridden to provide other ways of generating arguments.

```
public abstract class Activity
{
    public ArgumentCollection Arguments { get; }
    protected virtual void GenerateArguments(ArgumentCollection
arguments)
}
public sealed class ArgumentCollection : Collection<Argument>
{
    public ArgumentCollection( );
    public Argument this[string argumentName] { get; }
    public bool Contains(string argumentName);
    protected override void InsertItem(int index, Argument item);
    protected override void RemoveItem(int index);
    protected override void SetItem(int index, Argument item);
}
```

-continued

```
public sealed class Argument
{
    public const string ReturnValueName = "(ReturnValue)";
    public Argument(string name, Type argumentType, ParameterDirection
direction, Activity owner);
    public Type ArgumentType { get; }
    public ParameterDirection Direction { get; }
    public ActivityExpression Expression { get; set; }
    public string Name { get; }
}
```

Arguments contain an expression that determines what data the arguments are flowing between activities. These expressions are resolved to a value at runtime from an activity. For example, with the underlying expression model, a custom binding expression may be written, as in the following examples:

Variable Reference (e.g., input=s, where s references a variable that is in scope)

Complex Variable Reference (e.g., input=order.Name)

Complex Variable Expression (e.g., input=(string)orders [i] where orders and i are variables that are in scope)

Literal Expression (e.g., input="hello")

The workflow runtime enforces certain controls on argument resolution. One such control is that only the activity that owns an argument may resolve the argument to an underlying value. Another control is that in-values are "pre-fetched" when an activity is scheduled, and references (out/in-out) are evaluated to their component symbols when the activity is scheduled. In this manner, an activity instance has a predictable model of execution, (e.g., compatible with that of C#). Also, an activity gets a consistent view when looking at its in-values. Resolution is performed through two overloaded methods on an activity:

```
public abstract class ActivityInstance
{
    protected T GetArgumentValue<T>(Argument argument);
    protected T GetArgumentValue<T>(InOutArgument<T> argument);
    protected T GetArgumentValue<T>(InArgument<T> argument);
    protected void SetArgumentValue<T>(Argument argument, T value);
    protected void SetArgumentValue<T>(InOutArgument<T>
    argument, T value);
    protected void SetArgumentValue<T>(OutArgument<T>
    argument, T value);
}
```

GetArgumentValue and SetArgumentValue have "loosely-coupled" overloads that simply take an argument. This allows an author to write an activity whose contract with its caller is loosely-coupled based on the argument name/types.

By way of example, the following corresponds to an "Add" activity, which takes two integers as input parameters and has one integer (the sum of the two inputs) as an output parameter. Note that the parameters are exposed through CLR properties of type [In|Out]Argument<T>; there is a high-level programming model that supports generating both an activity description and its associated activity from a CLR class. In this programming model, parameters are manifested as input and output parameters of the marked-up operation.

The following sets forth a tightly-coupled example that generates loosely-coupled code:

```
[ActivityContract]
class AddActivity
{
    [ActivityExecuteOperation]
    int Add(int x, int y)
    {
        return x + y;
    }
}
```

The following is an example of a loosely-coupled declaration generated from the above example:

```
ActivityDescription add = new ActivityDescription("add");
add.Properties.Add(new Parameter<int>("x"));
add.Properties.Add(new Parameter<int>("y"));
add.Properties.Add(new Parameter<int>("result",
ParameterDirection.Out));
MethodInvoke addBody = new MethodInvoke(typeof(AddActivity));
addBody.Arguments[0].Expression = new
VariableLocationExpression<int>("x");
addBody.Arguments[1].Expression = new
VariableLocationExpression<int>("y");
addBody.Arguments[2].Expression = new
VariableLocationExpression<int>("result");
add.Body = addBody;
Sequence sequence = new Sequence( );
sequence.Variables.Add(new Variable<int>("i", 8,
VariableModifier.None));
Activity addStatement = add.CreateActivity( );
addStatement.Arguments[0].Expression = new
VariableLocationExpression<int>("i");
addStatement.Arguments[1].Expression =
ActivityExpression.CreateLiteral(4);
addStatement.Arguments[2].Expression = new
VariableLocationExpression<int>("i");
```

As an example of a simple sequence, the following statement:

```
{
    string s;
    s = ReadLine( );
    WriteLine(s);
}
```

Is represented as:

```
<Sequence>
    <Sequence.Variables>
        <Variable x:Name="s" Type="{x:Type s:String}"/>
    </Sequence.Variables>
    <ReadLine Result="[out s]" >
    <WriteLine Text="[s]">
</Sequence>
```

An example while loop is also shown herein, e.g., the following statement

```
int i = 0;
while (i < 5)
{
    WriteLine(i);
```

-continued

```
        i++;
    }
``` will be represented as:

```
<Sequence>
    <Sequence.Variables>
        <Variable x:Name="i" Type="{x:Type s:Int32}"/>
    </Sequence.Variables>
    <While Condition="[i < 5]">
        <Sequence>
            <WriteLine Text="[i] ">
            <Assign Value="[i+1]" To="[i]">
        </Sequence>
    </While>
</Sequence>
```

An example nested for each loop is also shown, e.g., the following statement

```
List<int> xPoints;
List<int> yPoints;
foreach (int x in xPoints)
{
    foreach (int y in yPoints)
    {
        Console.WriteLine(string.Format("({0}, {1})", x, y));
    }
}
```

Will be represented as:

```
<Sequence>
    <Sequence.Variables>
        <Variable x:Name="xPoints" Type="{x:Type s:List(Int32)}"/>
        <Variable x:Name="yPoints" Type="{x:Type s:List(Int32)}"/>
    </Sequence.Variables>
    <ForEach Index="x" Values="[xPoints]">
        <ForEach Index="y" Values="[yPoints]">
            <WriteLine Input="['(' + x + ',' + y + ')']">
        </ForEach>
    </ForEach>
</Sequence>
```

An example for a flowchart in which an output may be made via a parameter (instead of in another manner) is set forth below, and represented in FIG. 3 (where the four lines in "<Flowchart.Activities>" correspond to blocks 302-305, respectively):

```
<Flowchart>
    <Flowchart.Variables>
        <Variable x:Name="output1" Type="{x:Type s:string}"/>
        <Variable x:Name="output2" Type="{x:Type s:string}"/>
    </Flowchart.Variables>
    <Flowchart.Activities>
        <WriteLine x:Name="Task1" Text="First Item">
        <ReadLine x:Name="ParallelTask1" Result="[output1]">
        <ReadLine x:Name="ParallelTask2" Result="[output2]">
        <WriteLine x:Name="LastTask" Text="[output1 + output2]">
    </Flowchart.Activities>
    <Flowchart.Links>
```

-continued

```
        <FlowLink>Flowchart_Start - Task1</FlowLink>
        <FlowLink>Task1 - ParallelTask1</FlowLink>
        <FlowLink>Task1 - ParallelTask2</FlowLink>
        <FlowLink>ParallelTask1 - LastTask</FlowLink>
        <FlowLink>ParallelTask2 - LastTask</FlowLink>
        <FlowLink>LastTask - Flowchart_Complete</FlowLink>
    </Flowchart.Links>
</Flowchart>
```

Exemplary Operating Environment

Figure 3:
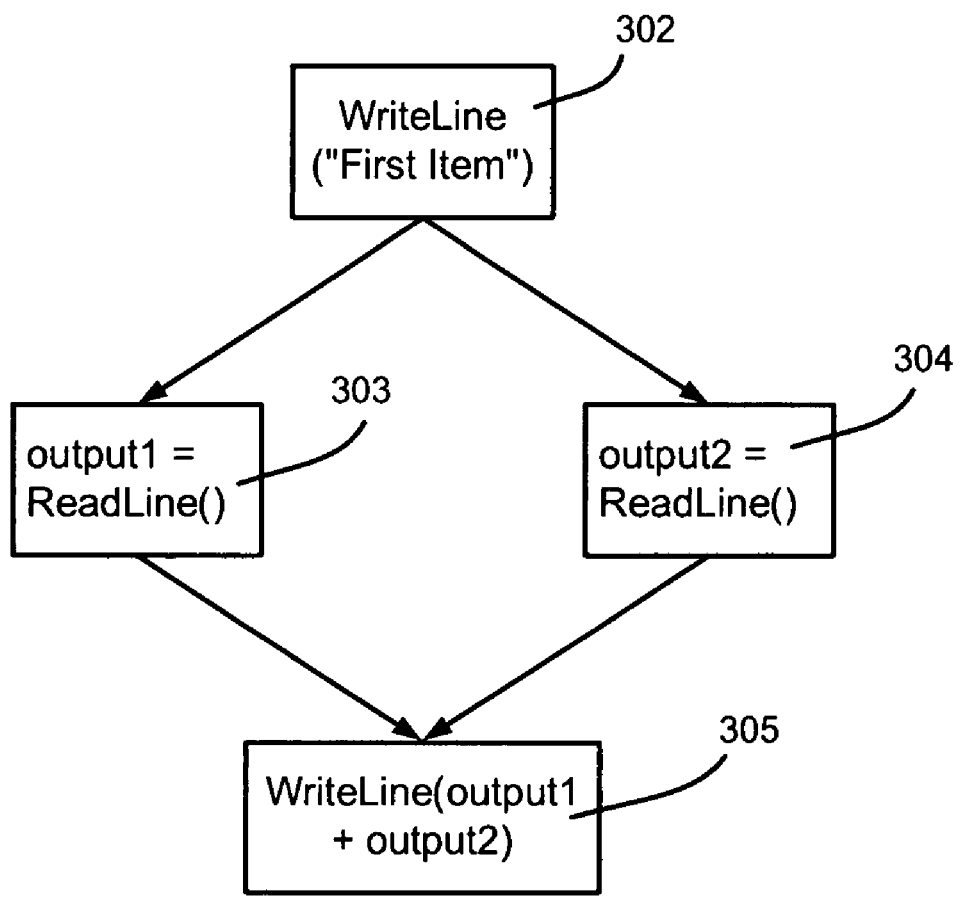
FIG. 3 is a representation of a flowchart related activity generated via code of a continuation based program.
Figure 4:
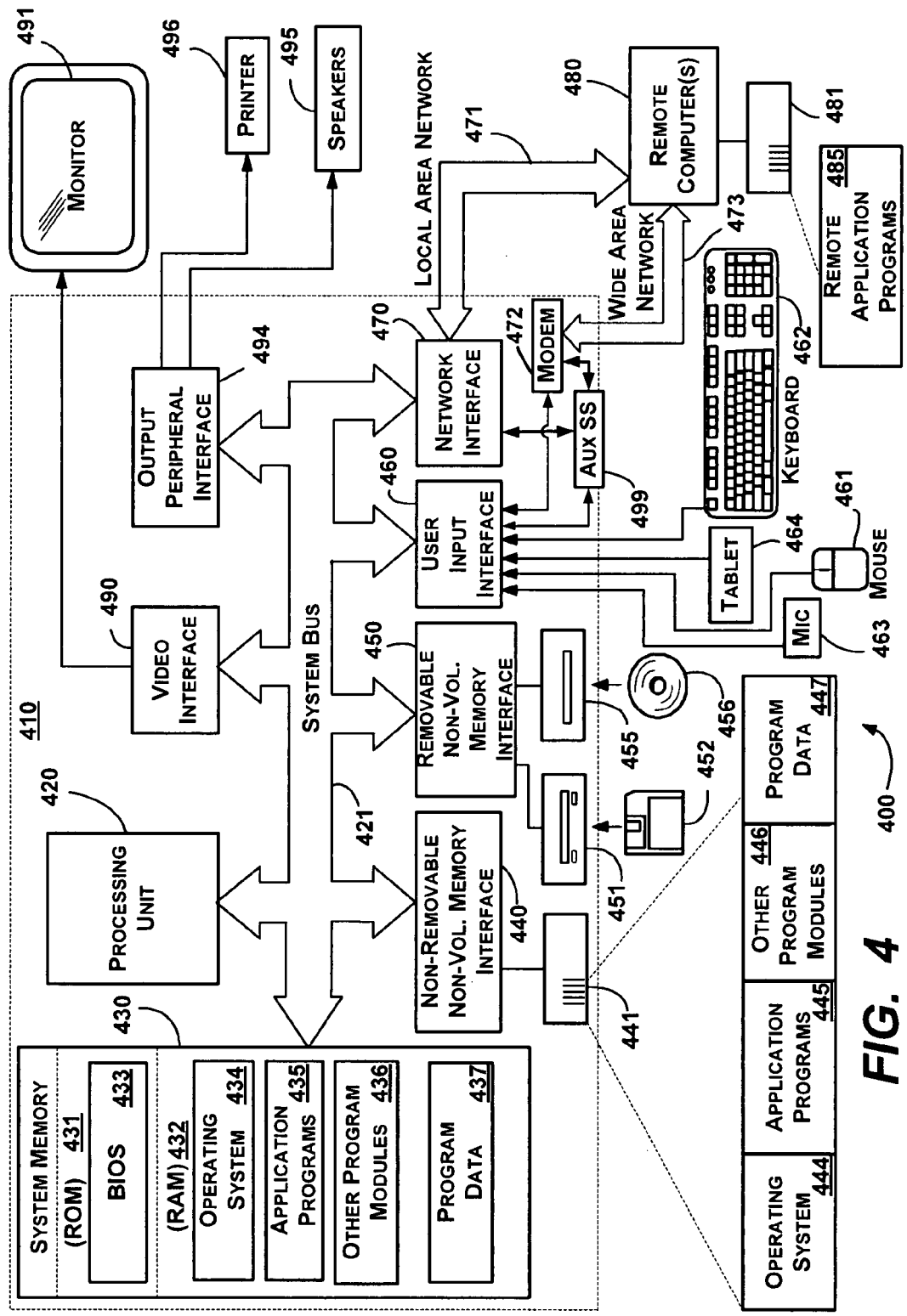
FIG. 4 shows an illustrative example of a computing environment into which various aspects of the present invention may be incorporated.

FIG. 4 illustrates an example of a suitable computing system environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable medium having computer-executable instructions, which when executed perform steps, comprising, processing activities of an activity tree in a continuation based runtime, in which at least one activity is associated with at least one parameter representing a flow of data relative to that activity, each parameter declared as an input parameter, an output parameter, or an input and output parameter, variables associated with activities of the activity tree within a scope defined by parent-child relationships of the activities in the activity tree, the variables representing data storage and providing for shared state among the in scope activities, the activities using the variables to produce result data when processed, and outputting the result data.

2. The computer-readable medium of claim 1 wherein outputting the result data comprises outputting the result data via an output parameter or via an input and output parameter.

3. The computer-readable medium of claim 1 wherein at least one of the activities of the activity tree comprises a composite activity, and wherein at least some of the variables are declared in association with the composite activity.

4. The computer-readable medium of claim 1 wherein at least one activity of the activity tree is a child activity of the composite activity, and having further computer executable instructions comprising, scheduling each child activity.

5. The computer-readable medium of claim 1 wherein each variable associated with an activity is disposed of upon completion of that activity.

6. The computer-readable medium of claim 1 having further computer executable instructions comprising binding a parameter to an in scope variable.

7. In a computing environment having a continuation based runtime, a system comprising, a data model for activities that are executed by the continuation based runtime, the activities arranged into an activity tree, including a topmost parent composite activity and at least one child activity of that topmost parent composite activity, the data model including a parameter set that defines an input and output flow of data with respect to the activities of the activity tree, the data model further including a variable set by which an ancestral relationship between a composite activity and any child activity of that composite activity defines a scope in which activities within that parental relationship may store and share data through variables in that scope, a binding mechanism that binds parameters to variables that are in its corresponding activity's scope, and the continuation based runtime configured to process work items and relate data to variables corresponding to scheduled child activities to input and output data via the parameter set.

8. The system of claim 7 wherein the activity tree includes at least one other composite activity in a child relationship with the topmost parent is a composite activity.

9. The system of claim 7 wherein a value for an input variable is pre-fetched when an activity is scheduled.

10. The system of claim 9 wherein output parameters or arguments or both parameters and arguments, or input and output parameters or arguments or both input and output parameters and arguments, are evaluated to corresponding references when the activity is scheduled.

11. The system of claim 7 wherein the runtime disposes of each variable associated with an activity when the activity completes.

12. The system of claim 7 wherein the runtime includes means for passivating and rehydrating an activity.

13. The system of claim 7 wherein the binding mechanism includes an argument owned by an activity, the including an expression that determines what data flows between which activities.

14. The system of claim 13 wherein the expression comprises a binding expression of a set, the set including a variable reference that references a variable that is in scope, a complex variable reference, a complex variable expression, or a literal expression.

15. The system of claim 13 wherein the runtime enforces that only the activity that owns an argument can resolve the argument to an underlying value.

16. In a computing environment, a method comprising, processing work items corresponding to activities of an activity tree in a continuation based runtime, including, scheduling child activities of one or more composite activities, enforcing that parameters that define flow direction and data with respect to an activity are only bound to state or to variables in scope, in which scope is defined by parent and child relationships including ancestor relationships between composite and child activities, and in which variables are declared with respect to composite activities to provide a data storage and sharing mechanism for activities that share scope, and outputting data that results from the processing of the work items.

17. The method of claim 16 further comprising, disposing of each variable associated with an activity upon completion of that activity.

18. The method of claim 16 further comprising, passivating an activity and rehydrating the activity.

19. The method of claim 16 wherein activities own arguments for binding, and wherein enforcing that parameters that are only bound to state or to variables in scope include only allowing the activity that owns an argument to resolve the argument to an underlying value.

20. The method of claim 16 wherein the runtime schedules activities, including pre-fetching a value for an input variable when an activity is scheduled, and evaluating other variable types to corresponding references when the activity is scheduled.

* * * * *